Aug. 12, 1969 R. L. SELS 3,461,311
SYSTEM FOR AND A METHOD OF IMPLEMENTING A THREE-VARIABLE LOGIC FUNCTION
Filed Feb. 18, 1966
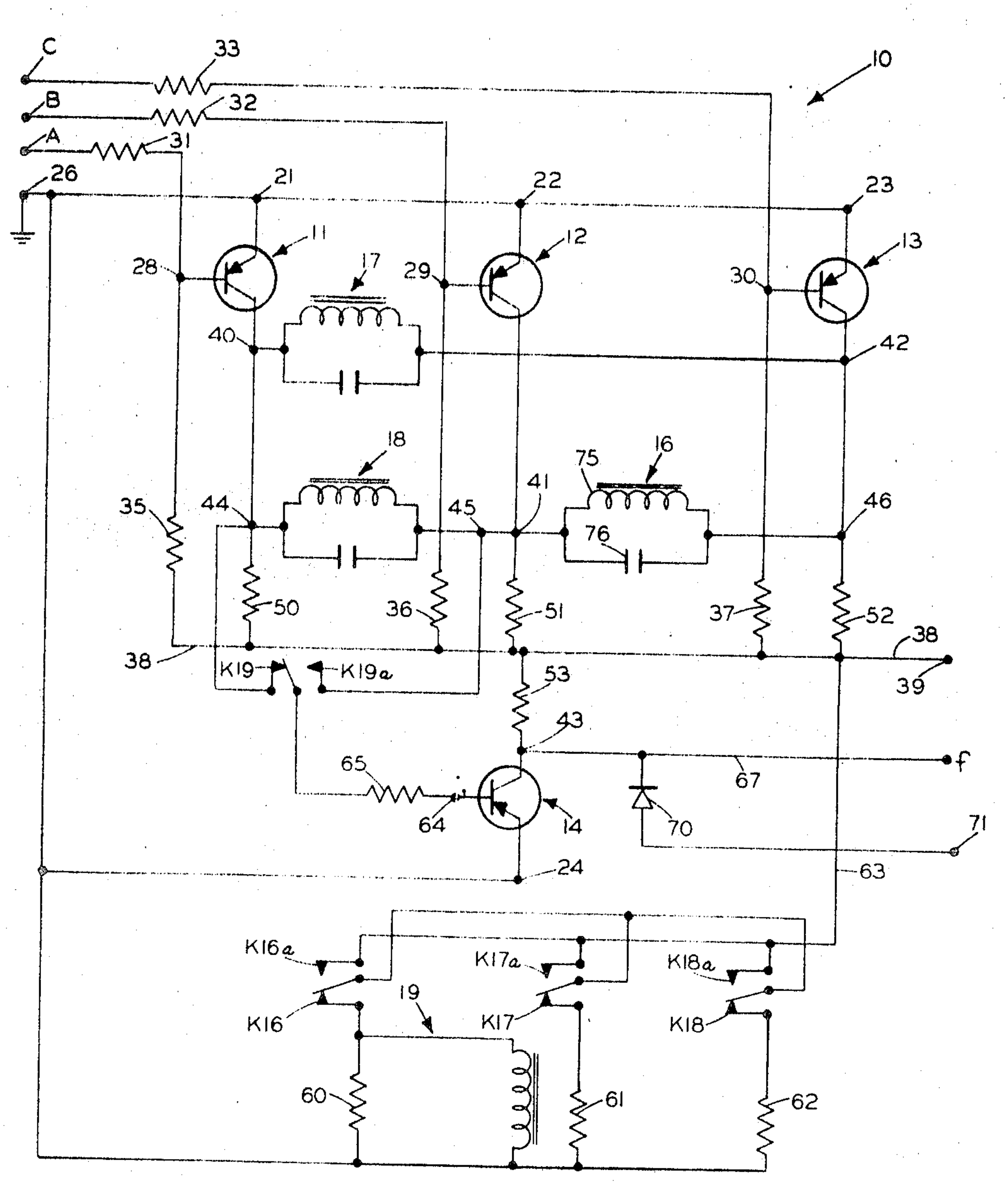
INVENTOR
R.L. SELS
BY J. M. Presson
ATTORNEY 3,461,311

SYSTEM FOR AND A METHOD OF IMPLEMENTING A THREE-VARIABLE LOGIC FUNCTION

Robert L. Sels, Reading, Pa., assignor to Western Electric Company, Incorporated, New York, N.Y., a corporation of New York Filed Feb. 18, 1966, Ser. No. 528,494
Int. Cl. H03k 19/42
U.S. Cl. 307—211 16 Claims

ABSTRACT OF THE DISCLOSURE

A circuit for implementing a three-variable logic function of the type $f=AB+AC+BC$, preselects one signal corresponding to the digital value of one of the variables as representing the value of the function and, subsequently, selects a second signal corresponding to the digital value of another variable as representing the value of the function, if the initially selected signal is not the same as that of at least one of the other two variables.

This invention relates generally to a system for and a method of implementing a binary logic function comprising an odd number of plural independent variables and more particularly, to a system for and a method of implementing a three variable Boolean logic function.

The design of digital logic systems and circuits is premised on the fact that a binary variable is a discrete variable having only two possible values, and further that Boolean variables are binary variables whose two possible values are 0 and 1 binary digits or bits of information.

A Boolean equation or function is formed of one or more independent Boolean variables which are usually denoted by capital letters, as for example, A, B, C . . . Z. The dependent variable of the Boolean equation is generally denoted by the symbol $f$ but in the instant specification, it will be denoted by the uncapitalized letter $f$.

The Boolean function $f=AB+AC+BC$ is a three-variable logic function which is characterized as being symmetrical by virtue of the fact that any permutation of its constituent independent variables A, B and C leaves unchanged the value of the function. The symmetrical characteristic of this function may be readily appreciated if, for instance, a 1 bit is assigned as the value of each variable A and B, and a 0 bit is assigned as the value of the remaining variable C. The binary value of the function $f=AB+AC+BC$ then becomes, $$f=1\cdot1+1\cdot0+1\cdot0=1+0+0=1$$

As will be apparent, this function will have the same 1 bit value if the variable B is interchanged with the variable C or with the variable A.

It bears mentioning, that by virtue of the symmetrical nature of this three-variable function, a canonical relationship exists between this function and other three variable Boolean functions. This relationship is known to those skilled in the art of designing digital circuits and is set forth in the available literature and therefore a further elaboration of this aspect of the function will not be undertaken.

In addition to being symmetrical, the binary value of the Boolean function $f=AB+AC+BC$ is governed by the instantaneous value of any two of the three constituent independent variables which have the same bit value. This characteristic of the function may be illustrated by assigning the same bit values to any two of the three constituent variables. For instance, assuming that the variables A and B have 0 bit values, the value of the function will also be a 0 bit regardless of the value of the variable C. Obviously, if all three constituent variables have the same bit value, the value of the function will be the same as that of its constituents. It should be appreciated that because the described function will have a binary value which is identical to that of the two variables having the same binary value, if the value of the two identical variables could be ascertained, one of these two variables could be regarded as redundant.

Since Boolean variables are assumed to have only bit values of 0 and 1, two discrete voltage level pulses may represent these variables. Positive logic convention dictates that a 1 bit be represented by the "higher" voltage level of a pulse signal and that a 0 bit be represented by a "lower" voltage level of the pulse. Negative logic convention dictates the inverse situation, that is where the 1 bit is represented by a "lower" voltage level and the 0 bit by a "higher" voltage level of a digital pulse. Thus, pulses having discrete voltage levels are utilized to represent 0 and 1 bits of information. In the instant specification, a positive logic convention will be assumed.

The physical implementation of the logic function to produce digital signal outputs that correctly correspond to various instantaneous combinations of signal input levels is typically achieved with solid state devices, particularly transistors. Transistors are capable of providing high amplification to low input signals and have switching speeds in the microsecond and nanosecond range. Further, the cycling life of a transistor is ordinarily far in excess of its auxiliary electrical circuitry. Relays do not possess these capabilities, but on the other hand, relays will isolate inputs from outputs while introducing minimal impedance into the circuit. A complex transistor circuit would be required to approach the degree of isolation that is made possible with a single relay. In addition, relays are less susceptible to erroneous energization by transient signals originating from external sources, and unlike transistors are not subject to drift with temperature and time. Thus, hybrid circuits that utilize at least some of the advantageous features of both transistors and relays are, in general, extremely useful.

This invention has as one of its objectives, the providing of a novel arrangement of semiconductor devices and bistable devices, specifically relays, to implement a logic function of the type described hereinabove.

More specifically, it is an object of the invention to provide a hybrid circuit employing transistors and relays that are interconnected in such a manner as to implement a Boolean function comprising an odd number of plural Boolean variables.

Further, it is another object of this invention to provide a circuit for implementing a three variable logic function of the type $f=AB+AC+BC$, which initially selects one signal corresponding to the digital value of one of the variables as representing the correct value of the function, but which further selects a second signal corresponding ta the digital value of another variable as representing the correct value of the function, if the circuit determines that the initially selected signal is not a redundant signal.

Still another object of this invention is to provide a method of determining the correct binary value of a Boolean function comprising an odd number of plural Boolean variables, which involves initially selecting one of the independent variables to represent the correct value of the function, and further selecting another variable to represent the value of the function, if after a classification process involving all the variables comprising the function is effected, the initially selected variable is determined not to represent the correct value of the function.

In accordance with one aspect of this invention, the Boolean function $f=AB+AC+BC$ is implemented by a logic circuit employing three transistors for receiving and amplifying digital input pulses representing the binary values of the independent variables forming the function. In addition, three bistable devices, specifically relays, are connected in a permutative fashion to the collector terminals of the transistors. These three relays are energized by different amplitude output signals appearing on any two transistor collector terminals. A fourth relay operates under the control of the three relays to selectively connect an output line to one of two available transistor collector terminals. One of the two terminals is preselected on the probability that it will receive a signal from its associated transistor that represents the binary value of the redundant variable or variables of the function. The logic circuit determines if that signal is in fact representing the binary value of the redundant variable or variables, and if not, the three relays assume states which will cause energization of the fourth relay. The energized fourth relay operates to switch the output line to the collector terminal of the transistor having thereon a signal that is representative of the binary value of the redundant variable, and thus representative of the value of the function.

In accordance with another aspect of this invention, a method is described for implementing a Boolean function comprising an odd number of plural indepedent variables. This method basically involves converting each independent variable to a discrete voltage having an amplitude that is representative of the binary value of the variable, preselecting one of the voltages as representing the correct binary value of the function, classifying all the variables on the basis of number and amplitudes, comparing the preselected voltage with the majority of voltages with the same amplitude, and then selecting a voltage corresponding to the majority of voltages as representing the correct value of the function, if this voltage is different from the preselected voltage.

Other objects and advantages of the invention will become apparent by reference to the following detailed description and the accompanying drawing which illustrates a logic circuit constructed in accordance with one specific embodiment of this invention.

Referring now to the drawing for a more complete understanding of the invention, the instant logic circuit 10 employs four PNP transistors 11, 12, 13 and 14 and four relays which are designated generally by the numerals 16, 17, 18 and 19. The emitter terminals 21, 22, 23 and 24 of the transistors 11, 12, 13 and 14, respectively, are connected to a common grounded terminal 26. The base junctions or terminals 28, 29 and 30 of the transistors 11, 12 and 13, respectively, receive digital input signals from input terminals designated A, B and C, respectively.

The designation of the individual input terminal by the letters A, B and C is purposeful to facilitate an understanding of this invention. The individual input terminals A, B and C are designated so as to correspond to the individual variables A, B and C, forming the Boolean function $f=AB+AC+BC$. The terminals A, B and C individually receive digital or pulse inputs having one of two discrete voltage levels and representing a 0 or 1 bit of information, depending upon the voltage level of each pulse input. The digital pulse inputs applied to the input terminals A, B and C may be derived from the output of any circuit or system which produces digital information signals of discrete pulse amplitudes that will operate the logic circuit 10. More specifically, the illustrated circuit 10 is designed to operate as intended when the input terminals A, B and C receive binary inputs in the form of discrete voltage signals having amplitudes of zero volt or slightly less, and +12 volts, respectively, from a suitable digital circuit. As mentioned previously, positive logic convention prescribes that an input signal of lower voltage level, or in this case of substantially zero volts, be considered as representing a 0 bit, and an input signal of higher voltage level, or in this case of +12 volts, be considered as representing a 1 bit.

Referring again to the drawing, the base terminals 28, 29 and 30 of the transistors 11, 12 and 13, respectively, are connected through resistors 31, 32 and 33, respectively, to the terminals A, B and C, respectively, and through base resistors 35, 36 and 37, respectively, to a line 38, and hence to a terminal 39. Each of the resistors 31 ,32 and 33 has a substantially equal value of resistance, of typically 2K ohms, and the individual resistors 35, 36 and 37 also have substantially identical resistance values, of typically 10K ohms. The terminal 39, and thus the line 38, is maintained at a negative D.C. voltage level of typically −18 volts.

With the resistors 31, 32 and 33 and the resistors 35, 36 and 37, respectively, connected to the base terminals 28, 29 and 30, the transistors 11, 12 and 13, respectively, may be designed or selected such that when an associated input terminal A, B or C receives a zero volt input signal, the base-to-emitter current supplied by the −18 volt line 38 will forward-bias the transistor receiving the zero volt input signal to full saturation or "turn-on." Further, the transistors 11, 12 and 13 may be designed or selected so that if an input signal of +12 volts is applied to any terminal A, B or C, the base-to-emitter voltage on the corresponding transistor will reverse-bias that transistor to a point of nonconduction or "turn-off." Several types of commercially available transistors will function as described hereinabove in the circuit 10. Thus, if any input terminal A, B or C is grounded or receives an input voltage signal of zero volt, the corresponding transistor 11, 12 or 13 will turn on; and conversely, the application of a +12 volt signal to any input terminal A, B or C will turn off its corresponding transistor 11, 12 or 13.

The collector junctions or terminals 40, 41 and 42 of the transistors 11, 12 and 13, respectively, and the collector terminal 43 of the transistor 14 are connected to one end of respective collector resistors 50, 51, 52 and 53. The collector resistors 50, 51, 52 and 53 typically have individual resistance values of 1K ohms and the opposite ends of these resistors are connected to the negative voltage line 38. When a transistor 11, 12 or 13 is turned on, the current through its associated collector terminal 40, 41 or 42 increases and the voltage at a collector terminal associated with the saturated transistor correspondingly increases to essentially zero volt. If the transistor 11 is turned off and the transistors 12 and 13 are turned on, the voltage level at the collector terminal 40 drops to substantially −12 volts. The −12 volt value is obtained by assuming that the impedance of each relay 16, 17 and 18 is substantially 4K ohms and that −18 volts is applied to the line 38. An analysis of the circuit will also establish that if two transistors, for example, transistors 11 and 12, are turned off, the voltage at the collector terminals 40 and 41, respectively, will be substantially −14.4 volts, while the voltage at the collector terminal 42 of the transistor 13 will be substantially zero volt. Obviously, if all three transistors 11, 12 and 13 are turned off the voltage on their collector terminals will fall to the −18 volt level of the line 38.

The collector terminal 41 of the transistor 12 is connected to one side of the relay 16 and the opposite side of this relay is connected to a terminal 46. The terminal 46 and the collector terminal 42 are essentially common terminals, as will be apparent. Opposite sides of the relay 17 are connected to the collector terminals 40 and 42 of the transistors 11 and 13, respectively, and opposite sides of the relay 18 are connected to the terminals 44 and 45. The terminals 44 and 45 and the collector terminals 40 and 41, respectively, are also essentially common terminals.

The relay 16 controls the making and breaking of its associated contacts K16 and K16*a*; the relay 17 controls the making and breaking of its associated contacts K17 and K17*a*; the relay 18 controls the making and breaking of its associated contacts K18 and K18*a*; and the relay 19 controls the making and breaking of its associated contacts K19 and K19*a*.

For reasons that will be evident subsequently, the coincidental application of "low" or "high" input signals to all of the terminals A, B and C will effect the deenergization of the relays 16, 17, 18 and 19. When all of the relays deenergize their associated contacts K16, K17, K18 and K19 make.

The contacts K16, K17 and K18 are individually connected to one side of associated current limiting resistors 60, 61 and 62, the opposite sides of the resistors 60, 61 and 62, being connected to the grounded terminal 26. The contacts K16*a*, K17*a* and K18*a* are connected by a common lead 63 to the negative voltage terminal 39. The contacts K16*a*, K17*a*, K18*a* and K19*a* make when their respective relays 16, 17, 18 and 19 energize, and break when their respective relays deenergize.

The resistors 60, 61 and 62 may be supplemented or replaced by conventional readout lamps (not shown). With the lamps connected across the resistors 60, 61 and 62 one of the three lamps will illuminate to provide a visual indication as to which relay 16, 17 or 18 is not energized at a particular instant, providing that two of the three relays are energized at that instant.

As an examination of the drawing will bear out, the relay 19 is energized through its connection to the negative bias lead 63 by the coincidental making of both of the contacts K17*a* and K18*a*, due to the energization of the relays 17 and 18, coupled with the making of the contact K16. When the relay 19 is energized, it operates to switch the base junction or terminal 64 of the transistor 14 to break the contact K19 and to make the contact K19*a*. Thus, the base terminal 64 of the transistor 14 is connected to the terminal 45 every time the relay 19 is energized, and remains so connected until the relay 19 deenergizes. Since the terminals 44 and 45 are at practically the same voltage levels as the collector terminals 40 and 41, respectively, the energization of the relay 19 operates to switch the connection of the base 64 of the transistor 14 from the collector terminal 40 of the transistor 11 to the collector terminal 41 of the transistor 12. Upon the subsequent deenergization of the relay 19, the base 64 switches back to its previous connection with the contact K19 and the collector terminal 40.

The transistor 14 includes a base resistor 65 of typically 18K ohms. With this value of resistance in the base circuit of the transistor 14, the transistor 14 will turn on when the voltage at the terminals 44 and 45, and hence at the contact K19 or K19*a*, to which the base is at that instant connected, drops to a voltage level that is less than zero volt, and more specifically, to at least −12 volts. Conversely, if the base terminal 64 of the transistor 14 receives a zero volt pulse from either the collector terminal 40 or 41 by virtue of making the contacts K19 and K19*a*, respectively, the transistor 14 will turn off.

It may be recalled that the voltage at either the collector terminal 40 or 41 falls to a range of between −12 volts and −18 volts, depending upon the states of the terminals 11, 12 and 13, when the corresponding transistor 11 and 12 is turned off by an essentially zero volt signal applied to the corresponding terminal A or B. The voltage of either the collector terminal 40 or 41 rises to essentially zero volt when the corresponding transistor 11 or 12 is turned on a by a +12 volt pulse applied to the terminal A or B, respectively.

The collector terminal 43 of the transistor 14 is connected by a signal output line 67 to an output terminal designated *f* and, as mentioned hereinabove, the letter *f* is selected to correspond with the symbol *f* that conventionally denotes the independent variable of the Boolean function being implemented. The terminal *f* receives pulses of discrete voltage levels that correspond at any particular instant to either the conductive or nonconductive state of the transistor 14. The digital signals received by the terminal *f* may be utilized by other logic circuits or other suitable systems, as will be apparent to those working in the art.

A diode 70 may be employed to clamp the level of the voltage at the collector terminal 43 at some constant, higher voltage level of, for example −6 volts, when the transistor 14 is turned off. The cathode of the diode 70 is therefore connected to the output line 67 and the anode of the diode 70 is connected to a terminal 71 having applied thereto −6 volts D.C. With the line 67 clamped at −6 volts, the voltage pulses received by the terminal *f* will have amplitudes of either −6 volts or essentially zero volts depending upon whether the transistor 14 is respectively off or on. If the base terminal 64 is connected to the contact K19 or K19*a* which, at that time, is at zero volt, the transistor 14 will be turned off and the clamping diode 70 will then clamp the line 67 at the −6 volt level.

Since there is no inverting of the input pulses by the circuit 10, and since the higher pulse voltage levels are assumed to represent the binary digit 1, an essentially zero volt pulse appearing at the output terminal *f* represents a 1 bit. A −6 volt pulse appearing at the output terminal *f* therefore represents a 0 bit. Obviously, if an inverted output is desired, another transistor having its base connected to the terminal 43 through a suitable base resistance, its collector connected through a suitable collector resistance to the line 38; and its emitter connected to the grounded terminal 26, could be added to the logic circuit 10. An inverted pulse output would then appear at the collector terminal of this signal inverting transistor and could be picked off this terminal.

Referring again to the relay circuits 16, 17 and 18, the relays 17 and 18 are essentially identical to the relay 16, and herefore a description of the latter relay will also suffice as a description of the relays 17 and 18. The relay 16 having an impedance of typically 4K ohms, as mentioned previously, includes a coil 75 and a capacitor 76. The capacitor 76, having a capacitance of typically 10 mf. is connected across the terminals of the relay coil 75. The capacitor 76 provides a desired time delay, of typically four milliseconds, to the operation of the relay 16. This time delay is normally sufficient to prevent undesired transients from energizing the coil 75. Such transients may originate from the auxiliary circuitry to which the logic circuit 10 is connected. In addition, the relay 16 serves to isolate the input signals applied to the terminals A, B and C from the output signals appearing on the line 67.

Similarly, the relay 17 is energized by differences in potential between collector terminals 40 and 42 of the transistors 11 and 13, respectively, and the relay 18 is energized by potential differences between the terminals 40 and 41 of the transistors 11 and 12, respectively. The relays 17 and 18 also serve to isolate the terminals A, B and C from the output line 67, and do not respond to spurious transients.

As mentioned previously, the relay 19 is energized when the relay 16 is deenergized and the relays 17 and 18 are simultaneously energized. Under these conditions, the contact K16 will be made and the coincidental making of the contacts K17*a* and K18*a* will complete a circuit which may be traced from the terminal 39 through the lead 63 and the contacts K17*a* and K18*a* and through the contact K16 to the upper end of the coil of the relay 19. Since the lower end of the coil of the relay 19 is grounded at the terminal 26, the relay 19 will be energized by the essentially −18 volts on the line 38. The energization of the relay 19 operates to break the contact K19 and to make the contact K19*a* for the period that the relay 19 remains energized. As the relay 19 is deenergized by, for example, the simultaneous deenergization of the relays 17 and 18, the relay 19 drops out and remakes the contact K19.

OPERATION

The operation of the logic circuit 10 can best be understood by referring to Table I, shown below. All eight possible combinations of voltage signals which might be applied to the input terminals A, B and C during the operation of the circuit 10 as well as the states of various circuit components corresponding to each combination of input signals are herein tabulated in eight horizontal rows. The state that each component assumes in response to any combination of input signals appears in the same row as that particular combination. The output signals received by the output terminal *f* for any combination of input signals are similarly indicated.

outputs. Following the previously assumed convention, the discrete input voltages of zero volt and +12 volts are designated in Table II by columns of 0 and 1 bits, respectively, and the signal output produced by the circuit 10 and appearing under its corresponding column of binary inputs is also designated by a 0 and a 1 bit. As related hereinabove, the zero volt pulse appearing at the terminal *f* is represented by a 1 bit and a −6 volt pulse appearing at the terminal *f* is represented by a 0 bit. Table II obviously reflects a direct binary relationship to Table I.

Continuing with the above example of operation where all three input voltages appearing at the input terminals

TABLE I

| Possible Input Voltages | | | States of Transistors | | | | States of Relays | | | | Output Voltages at Terminal *f* |
|---|---|---|---|---|---|---|---|---|---|---|---|
| A | B | C | 11 | 12 | 13 | 14 | 16 | 17 | 18 | 19 | |
| 12 | 12 | 12 | OFF | OFF | OFF | ON | DE | DE | DE | DE | 0 |
| 12 | 12 | 0 | OFF | OFF | ON | ON | E | E | DE | DE | 0 |
| 12 | 0 | 12 | OFF | ON | OFF | ON | E | DE | E | DE | 0 |
| 12 | 0 | 0 | OFF | ON | ON | OFF | DE | E | E | E | −6 |
| 0 | 12 | 12 | ON | OFF | OFF | ON | DE | E | E | E | 0 |
| 0 | 12 | 0 | ON | OFF | ON | OFF | E | DE | E | DE | −6 |
| 0 | 0 | 12 | ON | ON | OFF | OFF | E | E | DE | DE | −6 |
| 0 | 0 | 0 | ON | ON | ON | OFF | DE | DE | DE | DE | −6 |

NOTE.—All 12-volt inputs are positive. E=Energized. DE=Deenergized.

As a specific example of the operation of the circuit 10, assume that the first tabulated input signal combination comprising three +12 volt amplitude pulses are coincidentally applied to the terminals A, B and C. This particular combination of input signals appears at the left end of the first row of Table I. For reasons discussed hereinabove, the application of coincidental +12 volt pulses to the base terminals 28, 29 and 30 of the transistors 11, 12 and 13 will operate to turn off these three transistors. The voltages on the collector terminals 40, 41 and 42 of the now turned off transistors 11, 12 and 13, respectively, will fall to the −18 volt level of the line 38, and the voltage on the contacts K19 and 19*a* will also fall to −18 volts. With all three transistors 11, 12 and 13 turned off, there is practically no potential difference across the coils of the relays 16, 17 and 18, and consequently none of these relays energize. The contacts K16, K17 and K18 will assume those positions as depicted by the drawing and the relay 19 will be deenergized. Consequently, the base terminal 64 of the transistor 14 makes with the contact K19 and with the collector terminal 40 of transistor 11, which operates only in response to a voltage pulse of substantially +12 volts applied to the terminal A.

With the base 64 connected to the contact K19, the application of −18 volts from the line 38 through the resistor 65 to the contact K19 and hence to the base resistor 65 of the transistor 14, will forward-bias the transistor 14 sufficiently to turn on this transistor. When the transistor 14 turns on, the voltage at the collector terminal 43 rises to essentially zero volt and the output terminal *f* receives the zero volt signal from the line 67.

TABLE II

| | | | | | | | | |
|---|---|---|---|---|---|---|---|---|
| Inputs Represented in Binary Form: | | | | | | | | |
| C | 1 | 1 | 1 | 1 | 0 | 0 | 0 | 0 |
| B | 1 | 1 | 0 | 0 | 1 | 1 | 0 | 0 |
| A | 1 | 0 | 1 | 0 | 1 | 0 | 1 | 0 |
| Outputs Represented in Binary Form: | | | | | | | | |
| *f* | 1 | 1 | 1 | 0 | 1 | 0 | 0 | 0 |

Table II, above, is a tabulation of all eight possible combinations, arranged in column form, of binary inputs to the logic circuit 10 and the corresponding binary A, B and C are assumed to be "high," and therefore representable by 1 bits, the output of the circuit 10 will also be "high" and representable by a 1 bit. The first column of bits in Table II sets forth this relationship between the three inputs and the output.

As will be apparent from an examination of Table II, the three variable Boolean function $f=AB+AC+BC$ will be completely implemented by the method and circuit of this invention.

Referring again to Table I, and specifically to the fourth and fifth rows of the Table I, which more clearly exemplify the underlying theory of the invention, it may be seen that the relay 19 will be energized in only two cases out of the eight possible combinations of signal inputs considered. As discussed hereinabove, the relay 19 is energized to connect the base 64 to the contact K19*a* only when the state of the transistor 11 does not agree with the states of the transistors 12 and 13. Thus, the underlying theory of the instant invention may be viewed broadly as based upon redundancy considerations, and more specifically as based upon the relatively high probability (75%) that the state of one of the three transistors 11, 12 or 13 will agree with the state of at least one of the other transistors. The signal output from the other transistor may therefore be considered as redundant with respect to the signal output from the initially selected transistor, or vice versa. However, in the event that the signal inputs dictate that this presumption is in fact not valid, as evidenced by the transistors 12 and 13 assuming states different from that of the transistor 11, the logic circuit 10 will then operate to pick up the collector output from one of the other two transistors. Therefore, although in accordance with the above description of the instant invention, the variable A has been selected as being the redundant variable of the described Boolean function, the logic circuit 10 obviously could also be designed to preselect the variable B or C as the redundant variable. Further, it should be evident that the principles of this invention may be applied to any Boolean function having an odd number of plural independent variables, where the majority of the signals representing the variables having substantially the same amplitudes and represent the binary value of the function.

It should therefore be apparent from the foregoing description that various changes and modifications may be made of this invention without departing from the spirit and scope thereof.

What is claimed is:

1. A system for implementing a plural variable logic function comprising an odd number of independent variables which are representable by an odd number of discrete binary pulses, the system comprising:

plural electronic devices corresponding in number to the number of independent variables, each device being capable of undergoing a change of state and including input and output terminals;

the individual input terminals of said devices receiving pulses having discrete amplitude levels sufficient to change the states of said devices and being representative of the instantaneous binary value of each independent variable;

the individual output terminals of said electronic devices providing amplified digital output signals that are indicative of the states of their associated electronic devices;

plural bistable devices permutatively connected across said output terminals of said electronic devices and responsive to the combinations of states of all of said electronic devices;

utilization means connectable to one of said output terminals for receiving an output signal therefrom that is representative of the binary value of the function; and means controlled by the majority of said electronic devices that are in the same state, for selectively connecting said utilization means to the output terminal of one of said electronic devices which is in a state that is indicative of the state of the majority of said electronic devices.

2. The system claimed in claim 1, wherein said bistable devices comprise plural relays.

3. The system as claimed in claim 2, wherein the number of relays is equal to the number of said electronic devices.

4. The system as claimed in claim 3, wherein said electronic devices comprise semiconductor devices.

5. The system as claimed in claim 4, wherein said utilization means includes at least one electronic device for receiving and amplifying the output signal from one of said output terminals.

6. The system as claimed in claim 1, wherein the number of independent variables of the function is three.

7. The system as claimed in claim 6 wherein, said means controlled by the majority of said bistable devices comprise a fourth bistable device.

8. The system as claimed in claim 7, wherein said fourth bistable device comprises a relay having contacts connected to the output terminals of two of said electronic devices.

9. The system as claimed in claim 8, wherein said utilization device comprises a transistor having a base terminal selectively connectable to either of said contacts by operation of the fourth relay.

10. The system as claimed in claim 9, wherein said transistor further includes a collector terminal and an output lead connected to said collector terminal for receiving signals representative of the binary value of the function.

11. A method of implementing a symmetrical Boolean function comprising an odd number of plural independent Boolean variables, the method comprising:

converting each independent Boolean variable to a discrete voltage representative of the binary value of the variable;

preselecting one voltage as representing the correct binary value of the dependent variable of the Boolean function;

classifying the coincidental voltages representing the remaining independent variables of the function in binary form on the bases of frequency of occurrence and amplitude;

comparing one voltage with the number of coincidental voltages having substantially the same amplitude and with the total number of voltages representing the function; and selecting the voltage amplitude which is instantaneously in the majority, if different from said one voltage, as representing the binary value of the dependent variable.

12. In a system for implementing a plural variable logic function comprising an odd number of independent variables which are represented by an odd number of discrete binary pulses;

an electronic switching device associated with each of the variables and having an input terminal for receiving a pulse representative of the instantaneous binary value of each independent variable to change the state of each of said devices and having an output terminal for providing a signal indicative of the state of said device;

plural bistable devices permutatively connected across the output terminals of said devices and responsive to the combinations of states of all of said electronic switching devices;

utilization means connectable to one of said output terminals for receiving an output signal therefrom which is representative of the binary value of the function; and means controlled by the majority of the switching devices that are in the same state for selectively connecting said utilization means to the output terminal of one of said electronic devices which is in a state indicative of the majority of said electronic devices.

13. In a system for indicating at an output terminal the binary character of a Boolean function having three independent binary inputs and characterized in that the binary character of the function is the same as that of one of at least a majority of the binary inputs;

an electronic switching device associated with each of said inputs and having a first state when said input is one biinary character and a second state when said input is a second binary character;

normally unoperated means for preselecting the binary character of one of said inputs as the binary character of the function;

means responsive to the electronic switching device, associated with the preselected input, having a first state and the other switching devices having a second state for operating said normally unoperated means to select the binary character of one of the other two inputs as the binary character of the function; and means controlled by said normally unoperated means for selectively connecting said output terminal with the electronic switching device associated with the input having the same character as that of the function.

14. In a system for indicating at an output terminal the binary character of a Boolean function having three independent binary inputs, said binary character of said function determined by the character of one of at least a majority of said inputs;

an electronic switching device associated with each of said inputs, said device unoperated when said input has a first binary character and operated when said input has a second binary character;

normally deenergized means connected across each combination of pairs of said electronic switching devices;

a utilization device connectable to the electronic device having an input representative of the value of said function;

normally unoperated means rendered operable by the energization of the normally deenergized means connected across a preselected one of said switching devices and each of the other two switching devices for connecting the utilization device to said electronic device having said representative input; and means actuated when the normally deenergized means connected across the switching device associated with the preselected input and each of the other two of said switching devices are energized for operating said normally unoperated means to select another one of said inputs as the value of said function.

15. In a circuit for determining the binary character of a three-bit signal where the bits are in a binary form;

three normally unoperated transistors;

means associated with said transistors for operating said transistors in accordance with the binary character of the signal;

an output circuit;

means for normally applying a signal condition indicative of a first binary character on said output circuit;

means for switching the applied signal condition on said output circuit to a signal condition indicative of a second binary character;

means responsive to the operation of a first of said transistors and at least one of the other transistors to a first state for maintaining said first binary character on said output circuit; and means responsive to the operation of a first of said transistors to said first state and the operation of at least one other transistor to a second state for operating said switching means.

16. A system for indicating the value of a function having a three-variable input signal, each of said input signals having either a first value or a second value, said function having the first value or the second value as determined by at least two of said three variables;

an electronic switching device associated with each input and having a first state corresponding to said input having said first value and a second state when said input has said second value;

means associated with each of said switching devices for operating said switching devices in accordance with the input signal;

an output circuit;

means for normally applying a signal indicative of a preselected one of said variables on said output circuit;

normally unoperated means for switching the applied signal on said output circuit to a signal indicative of another variable;

means responsive to the signal indicative of said preselected variable and at least one of said other variables having the same value for maintaining said signal on said output circuit; and means responsive to said preselected variable having a value which differs from the value of at least one of said others variables for operating said switching means.

References Cited

UNITED STATES PATENTS

| | | | |
|---|---|---|---|
| 3,289,159 | 11/1966 | Woodward | 307—203 X |
| 3,378,695 | 4/1968 | Marette | 307—211 |

DONALD D. FORRER, *Primary Examiner*

U.S. Cl. X.R.

307—203; 317—148; 328—92